(12) United States Patent
Sanders et al.

(10) Patent No.: US 7,692,807 B1
(45) Date of Patent: Apr. 6, 2010

(54) SYSTEM AND METHOD FOR BATCH PRINTING HIGH-VOLUME ELECTRONIC DOCUMENTS FROM A NETWORK

(75) Inventors: Ryan E. T. Sanders, Tacoma, WA (US); Donald P. Frazier, Snohomish, WA (US)

(73) Assignee: Applied Discovery, Inc., Bellevue, WA (US)

( * ) Notice: Subject to any disclaimer, the term of this patent is extended or adjusted under 35 U.S.C. 154(b) by 1205 days.

(21) Appl. No.: 10/816,468

(22) Filed: Apr. 1, 2004

(51) Int. Cl.
*G06F 3/12* (2006.01)

(52) U.S. Cl. .................. 358/1.15; 358/3.28; 710/7; 710/20

(58) Field of Classification Search .............. 358/1.15, 358/1.16, 487, 3.28, 1.18; 715/517, 527; 710/8, 7, 20, 52
See application file for complete search history.

(56) References Cited

U.S. PATENT DOCUMENTS

| | | | | |
|---|---|---|---|---|
| 4,651,278 A * | 3/1987 | Herzog et al. | ............... | 358/1.18 |
| 5,592,683 A * | 1/1997 | Chen et al. | ..................... | 710/52 |
| 5,602,974 A * | 2/1997 | Shaw et al. | ................. | 358/1.15 |
| 5,982,997 A * | 11/1999 | Stone et al. | ................ | 358/1.15 |
| 6,184,996 B1 | 2/2001 | Gase | .......................... | 358/1.15 |
| 6,240,456 B1 | 5/2001 | Teng et al. | ................... | 709/230 |
| 6,327,045 B1 | 12/2001 | Teng et al. | ................. | 358/1.15 |
| 6,407,820 B1 * | 6/2002 | Hansen et al. | ............. | 358/1.15 |
| 6,431,772 B1 | 8/2002 | Melo et al. | .................... | 400/70 |
| 6,529,214 B1 | 3/2003 | Chase et al. | ................ | 345/744 |
| 6,646,754 B1 * | 11/2003 | Redd et al. | .................. | 358/487 |
| 6,943,866 B2 * | 9/2005 | Redd et al. | .................. | 358/487 |
| 2002/0046129 A1 | 4/2002 | Nakagawa | ..................... | 705/26 |
| 2002/0163665 A1 * | 11/2002 | Iwata et al. | ................ | 358/1.15 |
| 2003/0007180 A1 * | 1/2003 | Urasawa et al. | ............ | 358/1.16 |
| 2003/0142350 A1 * | 7/2003 | Carroll | ...................... | 358/1.15 |
| 2003/0167447 A1 * | 9/2003 | Hatta et al. | ................ | 715/517 |
| 2004/0158655 A1 | 8/2004 | Kremer | .......................... | 710/8 |
| 2004/0190042 A1 * | 9/2004 | Ferlitsch et al. | ........... | 358/1.15 |
| 2005/0076298 A1 * | 4/2005 | Lutz | ........................... | 715/527 |

* cited by examiner

*Primary Examiner*—Twyler L Haskins
*Assistant Examiner*—Nicholas C Pachol
(74) *Attorney, Agent, or Firm*—Black Lowe & Graham PLLC

(57) ABSTRACT

Large volumes of electronic documents can be printed from a network, such as the Internet, using a batch printing technique. Sizable print jobs are broken into batches, which are sent sequentially to a printer executable component at the client side. As one batch finishes printing, another batch is sent to the printer executable component. Logs are kept so that if there is an interruption in the printing, a print job can be re-started at any batch, instead of having to re-start printing in its entirety from the beginning. The electronic documents may also be downloaded for storage alternatively or in addition to printing. Stamps may be applied en masse to the electronic documents to be printed.

29 Claims, 16 Drawing Sheets

SYSTEM AND METHOD FOR BATCH PRINTING HIGH-VOLUME ELECTRONIC DOCUMENTS FROM A NETWORK

TECHNICAL FIELD

The present disclosure relates generally to network printing techniques, and in particular but not exclusively, relates to use of a batch-printing technique to efficiently print high volumes of electronic documents from a network, such as the Internet.

BACKGROUND INFORMATION

The Internet, while useful for accessing an almost limitless amount of information, is still clumsy in many respects. An example is when a large file or files have to be downloaded from the Internet, such as for printing or for local storage.

In some cases, a user can simply go to a particular web page and select a print option from a browser, which will result in printout of that web page to a local printer. However, such an operation typically involves printout of just a few pages and therefore generally does not pose undue inconvenience to the user or stress system resources.

In other cases, a PDF (or other file format) of an electronic file may be available for download (including local printing) from the Internet. These types of downloadable electronic files also generally do not pose an undue inconvenience if the files are small in size. However, the drawbacks of the Internet for printing becomes increasingly apparent when there is a large volume of content involved (e.g., the electronic files are large in size, such as an individual file having hundreds or thousands of pages, or there are many individual files to print).

In situations such as these, the user may have to wait a significant amount of time for the download to complete, as is commonly represented by a "Now Downloading" pop-up window, accompanied by a graphic such as a status bar or "flipping pages" that represent the progress of the download. As the download is performed, a network's bandwidth is monopolized by the downloading of the large amount of data, thereby preventing or limiting use of the network by other applications. This is particularly inconvenient if the network traffic and congestion is already high when the download is performed—the large download will take longer to complete (since many users will have to share the available bandwidth), and thus correspondingly cause other network connections to be deprived of network access or have very slow network connections. Moreover, resources at the server side and/or client side may not be able to effectively balance the load, if many large download requests are received from multiple users—a single back-end server can service only a certain amount of download requests at a given time.

Another problem is that if the download is unable to successfully complete, then it has to start over from the beginning. Unsuccessful completion of a download can be caused by a number of incidents, including insufficient disk space (to store the downloaded content), the printer runs out of paper, an interruption in the network connection, the client terminal or printer "locks up," one or more corrupted files is sent, print spool problems occur, and so forth. While unsuccessful download may not be of great consequence if the amount of content being downloaded is small, the consequences are more significant if the amount of content being downloaded is large. For example, if it has taken a few hours or overnight to complete 99% of a download, one can imagine the frustration if the download fails as it nears completion and thus has to start over again from the beginning.

BRIEF SUMMARY OF THE INVENTION

One aspect of the invention provides a method that includes receiving a print job that requests to print a set of electronic document pages that are available from a communication network. The method breaks up the print job into a plurality of batches each having a plurality of electronic document pages that together comprise the set of electronic document pages. The method applies stamps to electronic document pages of each batch, and separately sends each batch having stamps applied to its electronic document pages to a client terminal to print, while electronic document pages of other batches are having stamps applied to them.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

FIGS. 1-9 are user interface screen shots depicting example software tools that may be used in connection with printing or otherwise downloading electronic documents in accordance with various embodiments of the invention.

DETAILED DESCRIPTION

Figure 1:
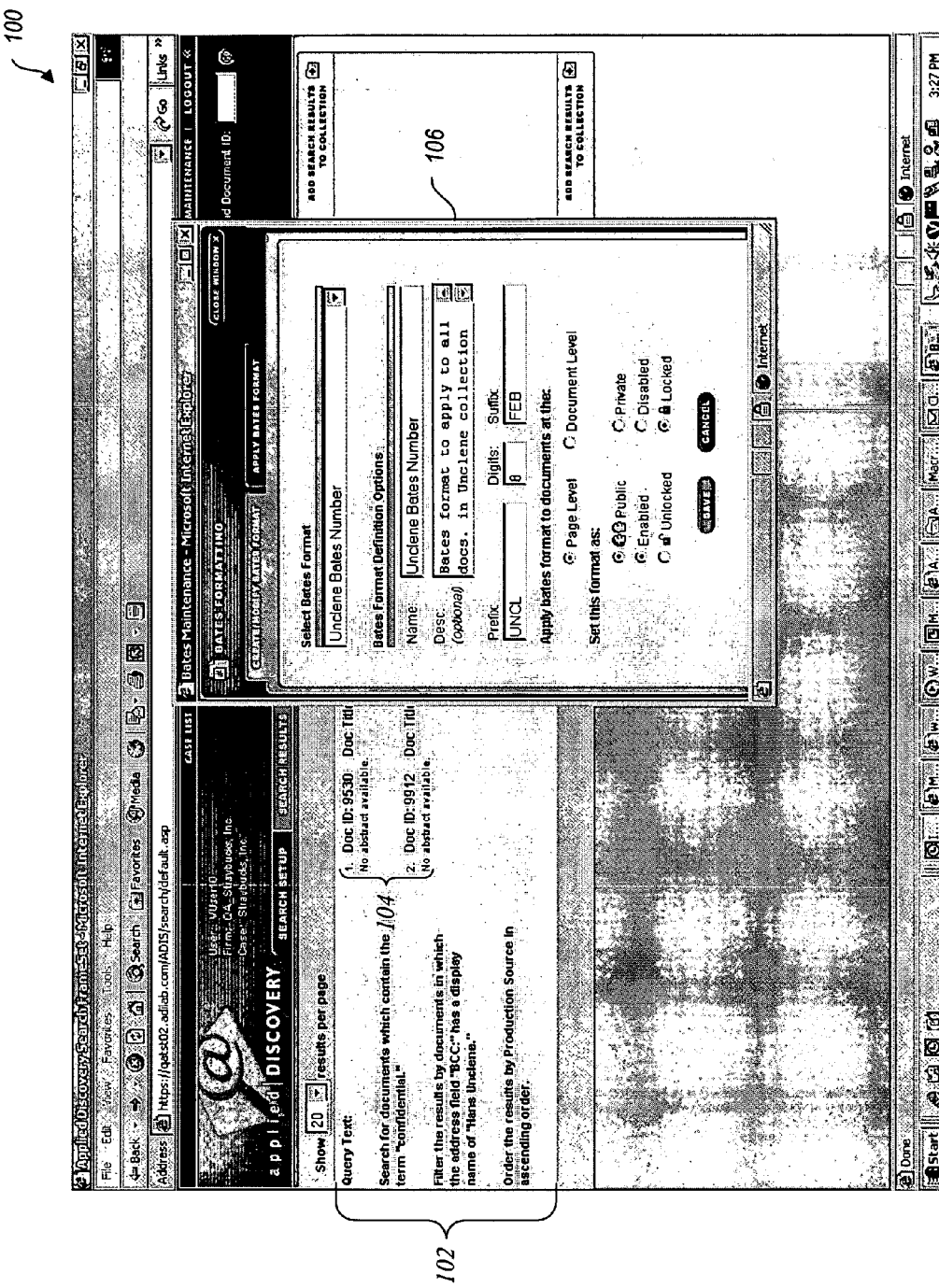

A portion of the disclosure of this patent document contains material that is subject to copyright or mask work protection. The copyright or mask work owner has no objection to the facsimile reproduction by any one of the patent disclosure, as it appears in the Patent and Trademark Office patent files or records, but otherwise reserves all copyright or mask work rights whatsoever.

Embodiments of techniques to efficiently download (including printing) a high volume of electronic files from a network (such as the Internet) are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a technique to allow a high volume of electronic documents to be printed from a network in a manner that is more efficient and improved as compared to current techniques. For purposes of illustration, the network will be described herein in the context of the Internet—it is appreciated that some embodiments of the invention may be implemented in other types of networks. Also, most of the detailed description will be provided in the context of a printing operation—it is further appreciated that this is only one type of applicable operation according to embodiments of the invention. Other applicable operations can include, but not be limited to, downloading electronic documents for storage in a storage unit, downloading the electronic documents for display on client terminals, and others.

To perform printing via the Internet, an embodiment of the invention uses a batch printing process. Once a request for a print job is received, the print job is broken up into a plurality of batches. The batches are sent sequentially from their source in the Internet to a printer at the client side, in response to a query from a printer-executable program at the client side. When each batch approaches completion of its printing at the printer, the subsequent batch is sent, until all batches have been sent and completed printing. Records of the print jobs and batches are maintained, so that if printing or transmission is interrupted for some reason, the records can be accessed to allow the print jobs the resume from where they were interrupted at a batch level, instead of starting over from the beginning. An embodiment of the invention also provides tools to allow stamps or other identification information to be applied to the document pages to be printed.

The terms "electronic files," "electronic document," "electronic legal document," and the like are used interchangeably herein to denote any type of electronic data that can be downloaded for printing or other purposes according to the described embodiments, including electronic data that is potentially subject to a legal proceeding. Examples of such electronic files include, but are not limited to, email files (e.g., .pst files, SMTP files, Microsoft Outlook™ email files, Lotus Notes™ files, and so forth), application files (e.g., Microsoft Word™ files, spreadsheets, and so forth), text, graphics, electronic calendars, media files (e.g., .wav files, mpg files), directory structures and indexes, or any other type of electronic file that has a file extension or other type of electronic data. In one example embodiment, the electronic documents are in the form of PDF files having one or more pages.

An example of a system with which at least some of the embodiments of the invention can be implemented is disclosed in currently pending U.S. patent application Ser. No. 09/520,264, entitled "NETWORK-BASED SYSTEM AND METHOD FOR ACCESSING AND PROCESSING LEGAL DOCUMENTS," filed Mar. 7, 2000, and assigned to the same assignee as the present application. U.S. patent application Ser. No. 10/452,810, entitled "SOFTWARE-BASED TOOLS TO FACILITATE ON-LINE PROCESSING OF ELECTRONIC FILES, INCLUDING A TOOL FOR ELECTRONIC REDACTION," filed May 30, 2003, which claims priority from U.S. Provisional Patent Application Ser. No. 60/384,989, entitled "ELECTRONIC REDACTION METHOD AND SYSTEM," filed May 31, 2002, and both assigned to the same assignee as the present application, also disclose systems and software tools with which an embodiment of the invention may be implemented. All of these applications are incorporated herein by reference in their entirety.

For purposes of recognizing and appreciating certain features of one or more embodiments of the invention, printing, downloading, stamping, and other operations related to a large volume of electronic documents will be described herein in the context of a legal process known as "discovery." As is known, discovery involves the production, review, and classification of documents (often an extremely large number of documents) during litigation. Embodiments of the invention are well suited to discovery or other legal processes (such as mergers and acquisitions) involving review and production of a large volume of documents, since techniques are provided that facilitate the downloading and printing of such documents from a network. The co-pending applications identified above disclose systems used in conjunction with facilitating the discovery process through electronic techniques. It is appreciated, however, that the invention is not strictly limited to use in the discovery process—other embodiments may be implemented in other scenarios where it is advantageous to efficiently download and print large volumes of documents from a network.

Also for purposes of recognizing and appreciating certain features of one or more embodiments of the invention, several example user interface screen shots will be provided and explained below with regards to some figures. FIGS. 1-9 are example screen shots illustrating use of software tools to facilitate the processing of electronic files for downloading, including printing, in accordance with various embodiments of the invention.

The above co-pending patent application (U.S. application Ser. No. 10/452,810) discloses various types of electronic tools available through one or more user interfaces that allow users to review, classify, organize, annotate, search, sort, or otherwise process electronic documents. For example and as part of a document review process during discovery, a user can use a tool to search a back-end database system for emails sent from a certain individual, on a particular date, and regarding some subject matter. Such searches can be performed using keywords, metadata, or both. After the search yields a set of results, the user can use other tools to annotate the documents from the result, such as marking them as hot, privileged, confidential, etc. Tools are also available for placing documents in custom collections and for redacting certain portions of the documents. Examples of these tools are described in further detail and also illustrated with example screen shots in the referenced co-pending application, and will not be repeated herein, for the sake of brevity.

One of these software tools is a tool to allow users to customize and apply Bates stamps to electronic documents. FIG. 1 is a screen shot of a user interface 100 through which such a tool may be used. The user interface 100 may be a browser-based user interface in one embodiment, where elements of the user interface 100 are provided by way of active server pages (ASPs). In this particular example, the user (such as an attorney or other legal professional performing electronic discovery) has submitted a query 102 for all electronic documents having the term "Confidential" somewhere in its text, with the results further being filtered according to a Bcc address field (such as for emails) having "Hans Unclene" as the addressee. The user has also specified that the results be listed or ordered according to "Production Source," such as alphabetically based on the name of the sender of the emails. The "hit list" or search results are shown at 104, which in this example comprise two electronic documents. Such queries and search results 104 can also be saved.

As is known, a Bates number is an alphanumeric sequence of characters that is applied to each page of a document for identification and reference purposes during discovery. With traditional paper discovery, Bates numbers are applied as stickers or rubberstamped in ink. In accordance with an embodiment described in the co-pending application, the user can define and specify the format of Bates numbers via use of an electronic tool rather than through manual methods. Furthermore, the user can organize, search, and sort electronic documents using Bates numbers, which become part of the metadata associated with the electronic documents.

FIG. 1 further shows an example of a tool that may be used to specify the format of Bates numbers. A pop-up window 106 includes fields where the user may select a particular Bates number format, define a Bates number format (including specifying the prefix, number of digits, and suffix), specify whether the Bates numbers are to be applied on a per page or per document level, and other options (including designation of public or private access rights). The defined Bates formats can then be assigned to individual documents, to documents in a collection, or to some other grouping of documents. Further details of defining, applying, and processing Bates formats and numbers are described in the co-pending application(s) above and will not be repeated herein, for the sake of brevity. As will be described later below, large volumes of documents can then be stamped with Bates numbers and then printed from a network using a batch printing process.

Figure 2:
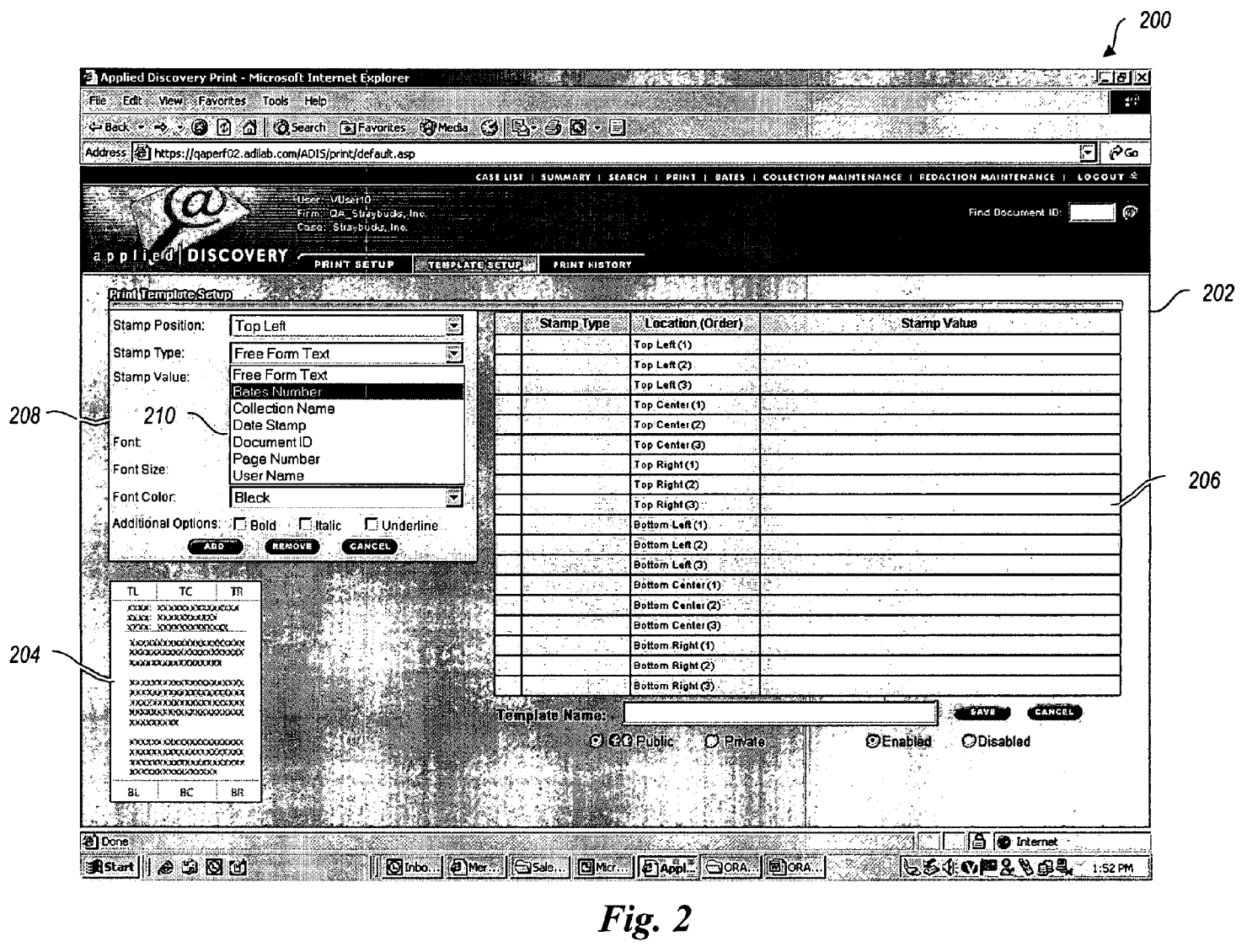

FIG. 2 shows a user interface 200 that presents a window 202 that can be used by the user to set up print template parameters. More specifically in accordance with one embodiment, the window 202 provides the user with tools to allow the user to specify where Bates number(s) and other stamps are to appear on hardcopy printouts. A template image 204 shows relative locations on a sheet where the user can place stamps, such as top left (TL), bottom right (BR), bottom center (BC), and so on. A table 206 lists these different locations, and has fields where the type of stamp and its value(s) may be placed in corresponding locations. In the illustrated example, the table 206 allows up to three distinct locations or orders, such as Top Left (1), Top Left (2), and Top Left (3), for each general area of the sheet.

Figure 3:
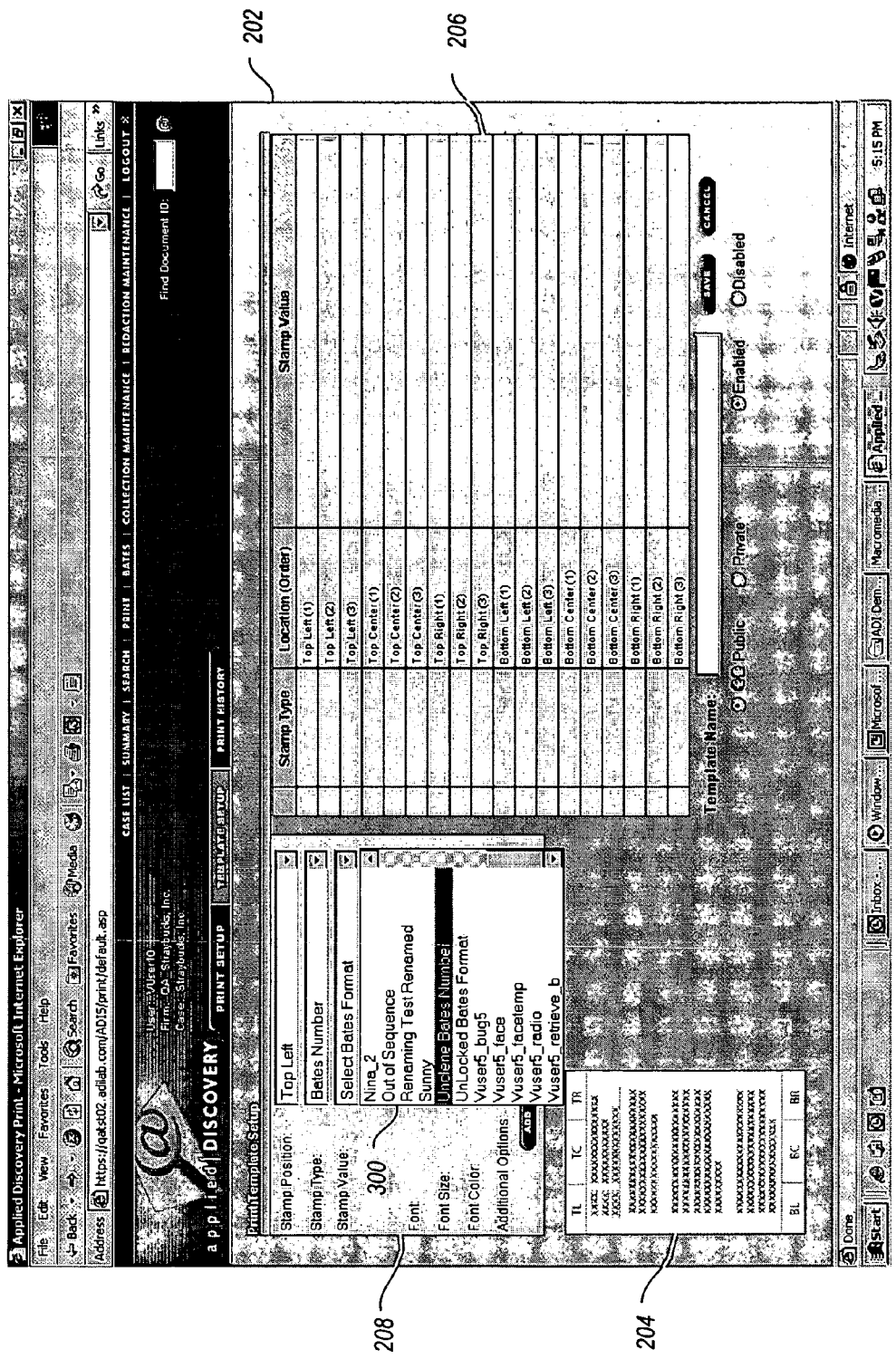

A template setup screen 208 provides various options for stamp positions (up to 18 locations in one embodiment), stamp type (up to 7 different stamp types in one embodiment, as listed illustratively at 210, such as Bates Number, Collection Name, Date Stamps, and so forth), stamp value, font settings, and others. FIG. 3 shows that the user has chosen, for the top left location (1) of the sheet, "Bates Number" as the stamp type from 210. This selection causes the screen 208 to display a list 300 of Bates formats from which the user can choose one of the previously defined formats (such as the previously defined "Unclene Bates Number" format).

If the user had chosen "Collection Name" from 210 in FIG. 2, then two options are provided by an embodiment. In a first option, the user can choose from a group of collection names and apply one of the corresponding collection names to the document—if the document did not belong to that collection to begin with, then the collection name is not stamped to the document. In a second option, documents can be conditionally stamped based on a priority. For example, collections for "highly confidential," confidential, etc. documents can be created in a type of priority tree. If a document belongs to the highly confidential collection, then it is stamped with "highly confidential," else the document is stamped with "confidential" or other stamp as defined by the priority tree.

Figure 4:
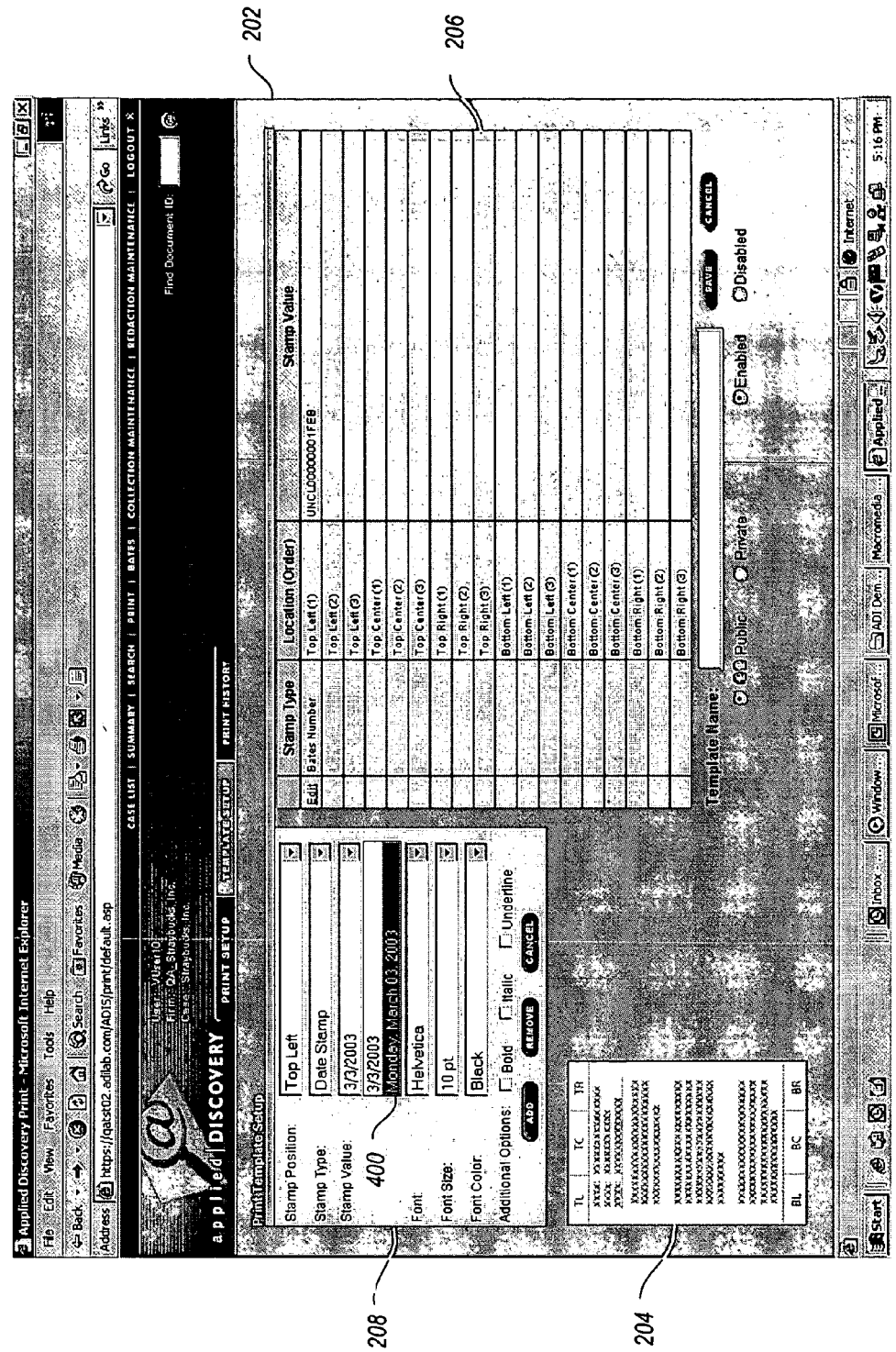
Figure 5:
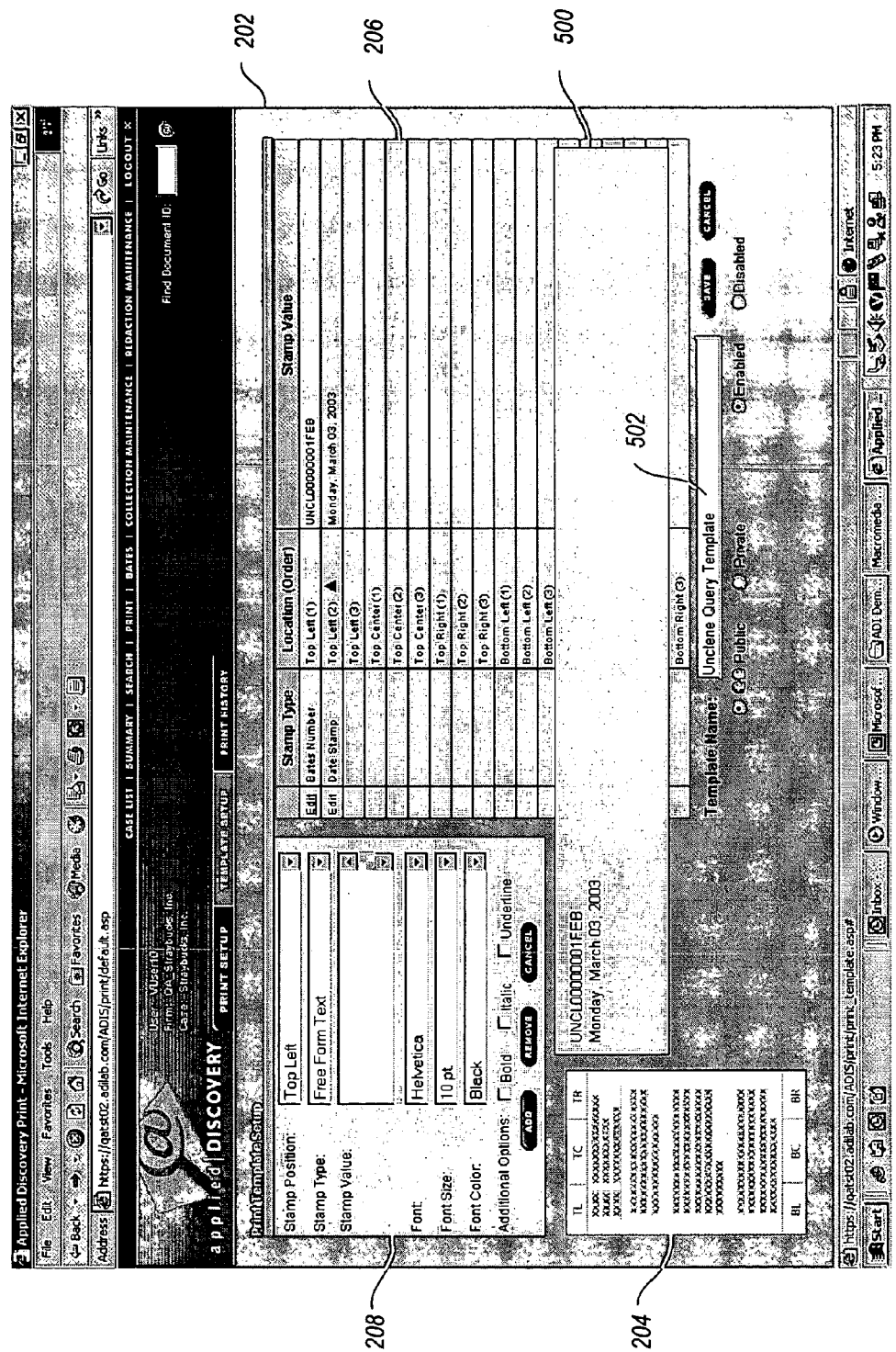

FIG. 4 shows that the user has further selected, for the top left location (2) of the sheet, a date stamp (stamp type) from 400. In FIG. 5, the two selected stamp types and their values, for the top left locations (1) and (2) of the sheet, are shown in the table 206. A preview window 500 shows the user how the stamps will appear on the printed sheet. The user is also given the opportunity to place at least one more stamp in the top left location (3) of the sheet, such as free form text via the template setup screen 208. The user may also save or name the particular template at 502, such as "Unclene Query Template," so that the template can be re-used for other print jobs.

In one embodiment, the various stamps are applied to a print template (which are then applied to temporary copies of the documents at the server side), rather than being electronically applied to the original electronic files themselves. Thus, the template information can be re-used for the same or different documents whenever a set of documents need to be printed or downloaded, where the template information is saved in a back-end or local storage area for subsequent re-use or modification if desired. The template may be saved under a template ID, template title, or other suitable identification technique to allow previously configured templates to be retrieved and its contents "stamped" or otherwise applied to electronic documents.

Figure 6:
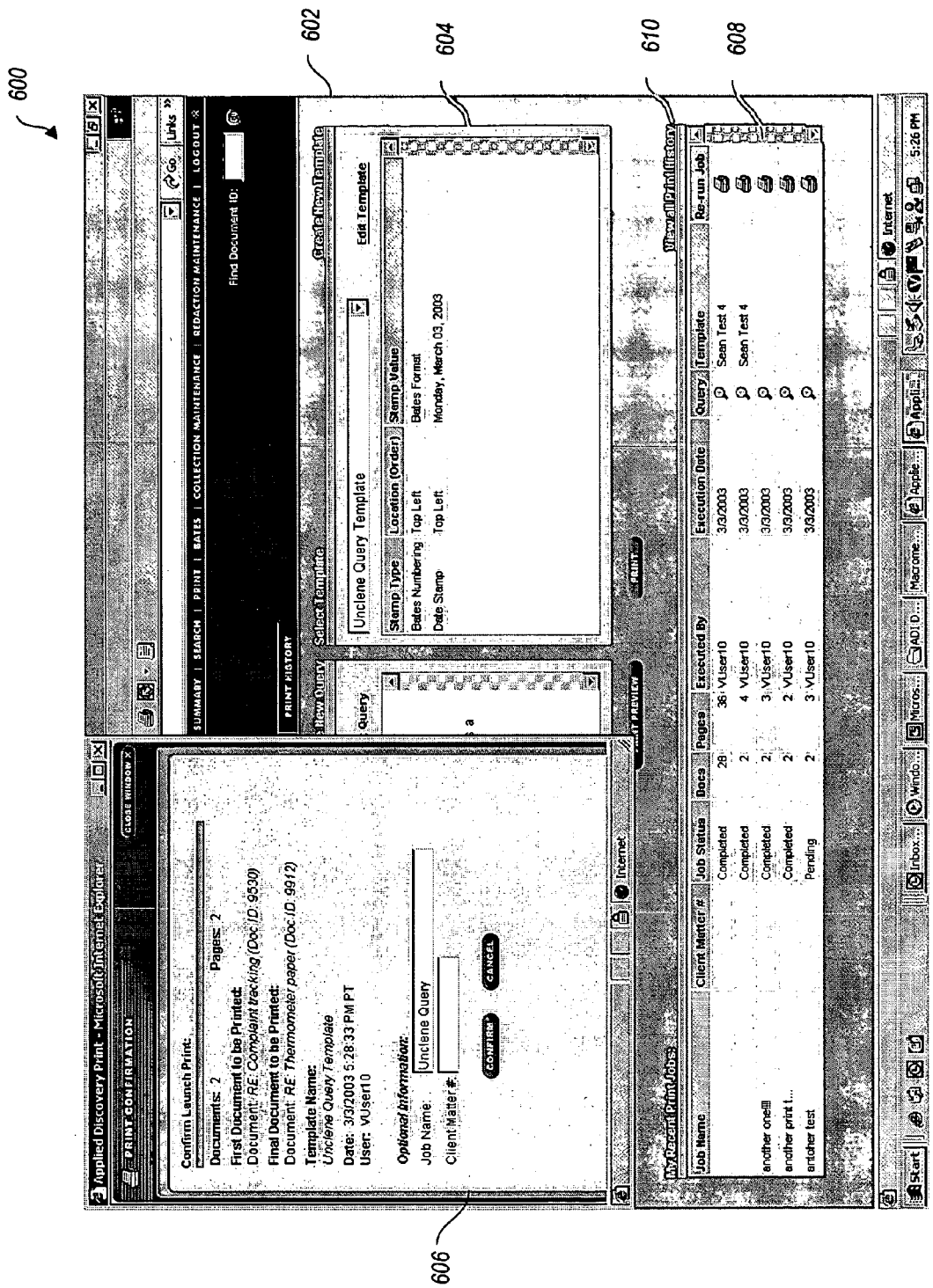

FIG. 6 is a screenshot of a user interface 600 that may be further used in connection with printing electronic documents that have been stamped in accordance with FIGS. 2-5. A window 602 includes a screen 604 where the user may select a specific template to apply for printing, which in this example is chosen as the "Unclene Query Template." A screen 606 is a confirmation screen to allow the user to confirm various settings prior to finalizing the print job. Examples of items that can be displayed via the screen 606 include, but are not limited to, number of documents, number of pages, identification of first document, identification of final document, template name, date, and user identification (ID). A job name may also be assigned to the print job by the user via the screen 606, as well as a client billing number for associating printing costs or other aspects of the print job to a particular attorney docket number.

A table 608 lists the status of various print jobs. In this manner, the user can view the status of recent print jobs and determine if they are completed, pending (including number of pages still remaining to be printed), and other related data. It is appreciated that the information shown in the user interface 600 is merely illustrative and is not intended to be exhaustive. A "View All Print History" option, if selected, results in the display of the entire print history. For example in FIG. 9, a table 900 displays a portion of the entire print history. As evident from the table 900, other print jobs are completed, paused, pending, or canceled. There is also an option to re-run any of the listed print jobs or portions thereof.

Figure 7:
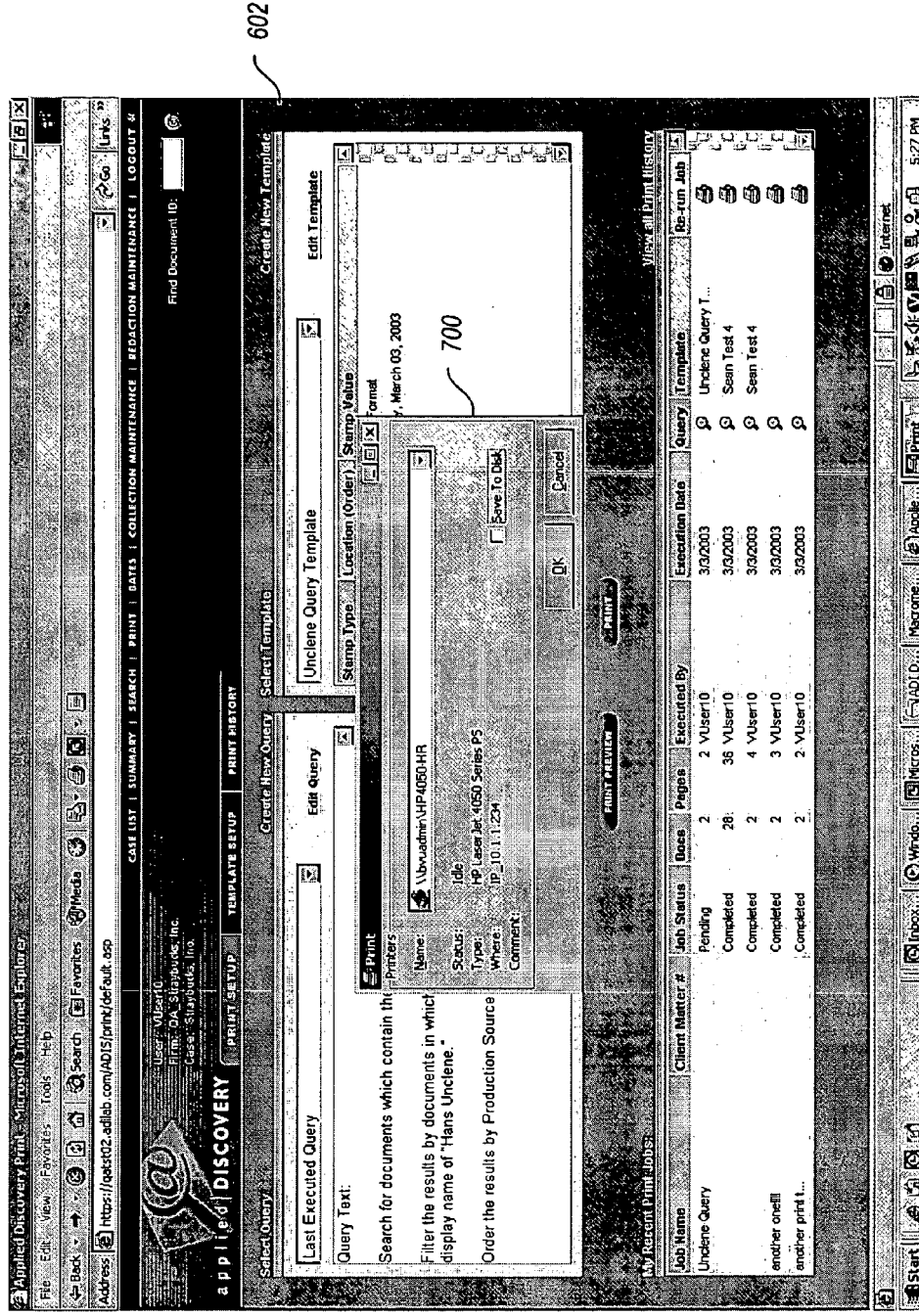
Figure 8:
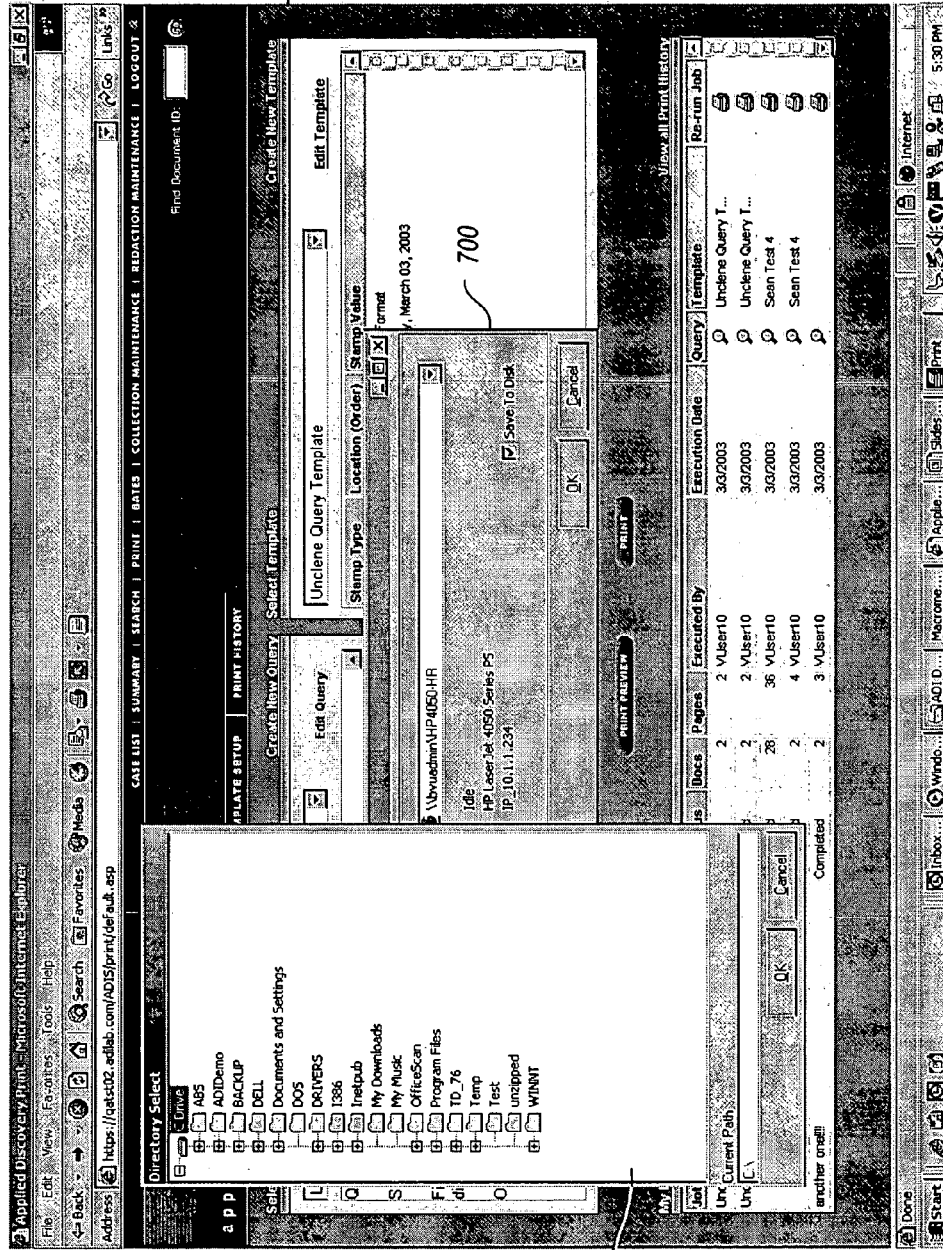

After the user has clicked a "Confirm" button in the screen 606 of FIG. 6 to confirm the template settings for printing, then a window 700 appears in FIG. 7. The window 700 allows the user to select a printer (such as a network printer, local printer, and the like) that will receive the batches to print. Alternatively or in addition, the user may elect to save the electronic documents to disk (such as via download to local disk, network server, file system, and the like), by clicking on a "Save To Disk" option. FIG. 8 shows a window 800 that can be rendered if the user selected this option. As illustrated, the user can select from a number of folders in a directory where the documents are to be saved. The user can also create new folders for the directory, and save the documents in the newly created folder(s).

The subsequent figures describe embodiments of various system components that cooperate to store stamping information, apply the stamping information to selected electronic documents, and then batch-print, save to disk, or otherwise download the electronic documents having the stamping information applied thereto. Such system components may be integrated with the systems disclosed in the co-pending patent applications identified above. For the sake of brevity, components of these systems that are only ancillary to the stamping and batch-printing (or other downloading) features are not shown or described in detail herein.

Figure 10:
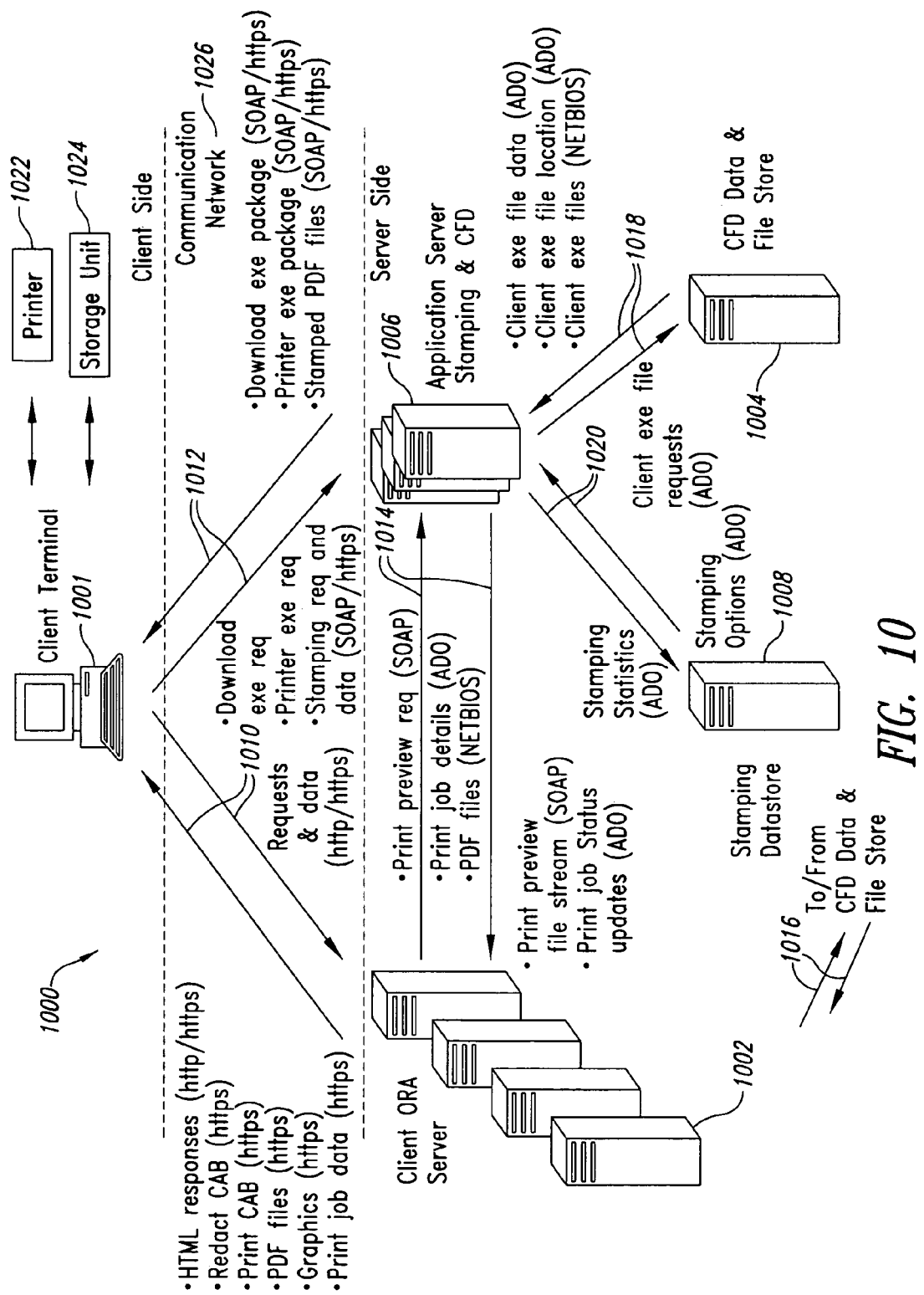
FIG. 10 is a block diagram of a system in which an embodiment of the invention may be implemented.

FIG. 10 is a block diagram of an example system 1000 in which an embodiment of the invention may be implemented. The system 1000 includes one or more client terminals 1001 at a client side, a communication network 1026, and server-side components with which the client terminal 1001 can communicate via the communication network 1026. Arrows in FIG. 10 depict transactional requests and responses between the various components.

In addition to one of more client terminals 1001, the client side includes one or more printers 1022 and/or one or more storage units 1024. The printer 1022 is communicatively coupled to the client terminal 1001, and can be a local printer or a printer that is shared between multiple client terminals 1001 via a network. The storage unit 1024 can be local storage (such as a hard disk in the client terminal 1001), a file system, a networked storage unit, or other type of storage unit.

The communication network 1026 can comprise the Internet, an intranet, local area network (LAN), virtual LAN, virtual private network (VPN), or other type of network. The communication network 1026 can include either or both wireless or hardwire communication links. For purposes of explaining various embodiments herein, the communication network 1026 will be described in the context of the Internet hereinafter.

The server-side components of one embodiment include one or more client online application review application (ORA) servers 1002. Among other things, the ORA servers 1002 operate to process queries for electronic documents received from the client terminal 1001 and are involved in the batch printing process, as will be described later below. In an embodiment, a separate ORA server 1002 is dedicated to each particular one or more client terminals 1001 from the same organization, such as a law firm.

A client file download (CFD) data and file store(s) 1004 is used to store read-only copies of electronic documents, metadata associated therewith, indexed text of the electronic documents, and other data that is obtained in connection with the processing of the electronic documents as described in the co-pending applications identified above. One or more of the application servers 1006 can be provided with stamping and CFD services or applications. In an embodiment, a stamping service obtains copies of electronic documents from the file store 1004, stamps the copies, and then sends the stamped copies of the electronic documents to the client terminal 1001 for printing at the printer 1022 or for storage in the storage unit 1024. A stamping data store 1008 stores configuration parameters or other information associated with the process of stamping documents, including stamping statistics that keep track of which electronic documents have been stamped. Stamping data details, such as Bates formats, stamp locations, Bates numbers, and other stamping details as applied to particular electronic documents can be stored in any suitable location at the server side, including at the ORA server 1002, at the application server 1006, at the file store 1004 (as metadata, for instance), at the stamping data store 1008, or other location(s) or any suitable combination thereof.

The bi-directional sets of arrows shown in FIG. 10 will now be explained. A first set of arrows 1010 represents requests and other data sent from the client terminal 1001 to the ORA server 1002, and also represents the responses and other data from the ORA server 1002 back to the client terminal 1001. The requests and data sent to the ORA server 1002 can comprise document queries or other communication of information involved in the example screen shots described above. The responses sent from the ORA server 1002 can include PDF files, graphics, data associated with redaction, or other responses. For example, user interfaces at the client terminal 1001 can display PDF versions of electronic documents (such as PDF copies of emails) that correspond to a certain query sent from the client terminal 1001. In one embodiment, the various requests and responses can be hypertext markup language (HTML) responses that use the http or https protocols, with redaction information being communicated as cabinet (CAB) files, for example.

In an embodiment, the arrows 1010 also represent the communication of print or other download requests from the client terminal 1001 to the ORA server 1002. From the ORA server 1002 to the client terminal 1001, printing-related data (via CAB files, in an example embodiment) can be sent, as well as the communication of print job data including stamping information via https (such as which electronic documents to print in the print job, print job name, and other print job information and associated stamping details depicted in the user interfaces described previously above).

A second set of arrows 1012 represents stamping, download, or print requests and responses, as exchanged between the client terminal 1001 and the application server 1006. For instance, the arrows 1012 can include requests for printer or download executable files from the client terminal 1001, where such executable files, packages, or software components are initially downloaded into the client terminal 1001 so that these executable files can control and manage printing and downloading, as will be described in greater detail below. The arrows 1012 also represent requests sent from the client terminal 1001 to the application server 1006 to stamp certain documents (identified by a print job and by a print template ID associated to that print job) for printing or other downloading, where the stamped documents are returned from the application server 1006 as stamped PDF files via SOAP/https in one embodiment.

A third set of arrows 1014 represents the communication between the ORA server 1002 and the application server 1006 (including one or more stamping servers), when performing queries to the CFD data and file store 1004, retrieving files therefrom (such as PDF files via a NETBIOS protocol, for example), storing data thereto (such as tags, saved queries, redaction information, metadata, and others), and other operations. In one embodiment, the arrows 1014 also represent the communication of specific print job details (via ADO) and print preview requests (via SOAP) from the ORA server 1002 to the stamping server, as well as the return communication of the print preview file stream (via SOAP) and print job status updates (via ADO). The print job status updates allows the ORA server 1002 to keep track of print jobs on a per batch basis or even smaller granularity, so that users at the client terminal 1001 can track the status of print jobs (e.g., completed, pending, error, etc.), and thus are able to selectively re-start a print job at any batch without having to restart from the beginning of the entire print job.

Alternatively or in addition, a fourth set of arrows 1016 represents that the ORA server 1002 can communicate with the CFD data and file store 1004 and/or the stamping data store 1008 without necessarily using the application server

1006. The particular data flows in FIG. 10 can be based on factors such as where specific data is stored, which component is requesting the data, which component has to process the data (if needed) prior to sending the processed data to a data requester, and others.

A fifth set of arrows 1018 represents requests and responses exchanged between the application server 1006 and the CFD data and file store 1004. These exchanges include, for example, requests (sent from the application server 1006 using an ADO application program interface, for example) for stored files and the corresponding responses to the application server 1006. The requested files (including file data and file location information using ADO and copies of the files themselves using NETBIOS) can include copies of PDF files that are to be stamped and sent to the client terminal 1001 for printing on the printer 1022. A sixth set of arrows 1020 represent the exchange of stamping statistics via (ADO) and stamping options (ADO) between the stamping server (at the application server 1006) and the stamping data store 1008).

Figure 11:
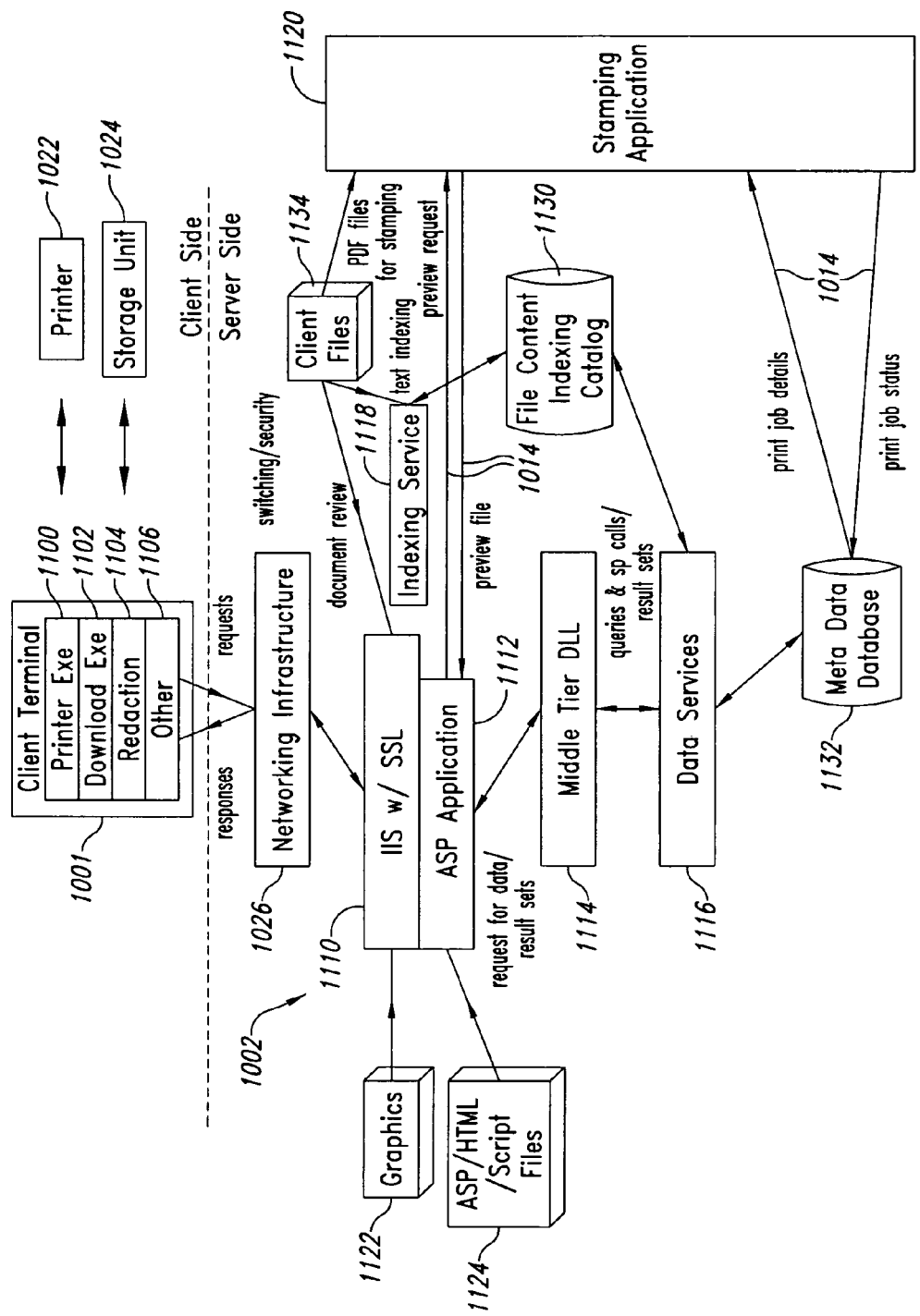
FIG. 11 is a block diagram showing a part of the system of FIG. 10 in more detail in accordance with an embodiment of the invention.

FIG. 11 is a block diagram showing a part of the system 1000 of FIG. 10 in more detail in accordance with an embodiment of the invention. In particular, FIG. 11 show some of the software architectural components of the ORA server 1002 and client terminal 1001 in more detail, along with other components of the system 1000.

A networking infrastructure, such as the Internet or other communication network 1026, can provide switching, security, and other communication mechanisms. The ORA server 1002 includes an Internet Information Server (IIS) or other suitable web server, with a secure sockets layer (SSL) or other security component 1110 for encryption and an ASP (or other similar) application 1112 to process queries and process result sets in the form of ASP pages. The ORA server 1002 of an embodiment further includes a middle-tier dynamic link library (DLL) component 1114 and at least one data service 1116, which can operate as an engine to process queries, calls, and result sets.

Server units 1130, 1132, and 1134 are represented in FIG. 11 in connection with storage of indexed text (or other file content), metadata, and read-only client files (such as PDF files), respectively, and which collectively comprise part of the CFD data and file store 1004 of FIG. 10. According to an embodiment of the invention, the server unit 1130 can use a commercially available indexing search engine format and algorithms; the server unit 1132 can use a commercially available ANSI SQL-compliant database format and related algorithms and data structures; and the server unit 1134 comprises a file server. Also in an embodiment, the server unit 1132 stores, as part of metadata for the various electronic files, the associated print job details to provide to a stamping service or stamping application 1120 (residing at the application server 1006), and also stores print job status information received from the stamping application 1120 (depicted once again by the arrows 1014).

An indexing service 1118 may be used to perform the text indexing between the server units 1130 and 1134. In one embodiment, copies of PDF files stored at the server unit 1134 are provided to the stamping application 1120, so that these copies can be stamped appropriately as described above and then sent to the client terminal 1001 for printing or storage.

Requests (such as queries from the client terminal 1001) are conveyed by the ASP application 1112 to the DLL component 1114, which then calls the data service 1116. The data service 1116 then communicates with the server units 1130 or 1132 to obtain result sets that match the queries.

The ASP application 1112 cooperates with the stamping application 1120 to request a preview of an electronic file to be printed from the server unit 1134, and is then provided with a copy of the electronic file so that it can be stamped by the stamping application 1120 and previewed by the user.

Graphics 1122 are also provided as part of the previously described user interfaces. ASP, HTML, script, or other suitable files 1124 are provided to the client terminal 1001 via the ASP application 1112. In operation of one embodiment, ASP files 1124 are generated by the ASP application 1112 for each page view provided by the user interfaces. ASP files are also generated each time the user performs certain operations, such as tagging a document, creating a collection, viewing a hit list, redacting, assigning a Bates number, creating a print template, and so forth.

The client terminal 1001 of FIG. 11 includes a printer executable component 1100, a download executable component 1102, redaction control and plug-in components 1104, and other controls or components 1106. The redaction components 1104 are described more fully in the co-pending U.S. patent application Ser. No. 10/452,810 identified above, and therefore will not be discussed further herein. The printer executable and download executable components 1100 and 1102 may be downloaded and installed into the client terminal 1001 from the application server 1006 as depicted in FIG. 10, and operate to manage and control the printing and other downloading of electronic documents. For example, the printer executable component 1100 of one embodiment comprises a software program or application that acts as a controller to manage traffic between the stamping service at the application server 1006 and a print spooler for the printer 1022. The printer executable and download executable components 1100 and 1102 may be part of a browser application in one embodiment, and can be distinct and separate from a browser in another embodiment.

Figure 12:
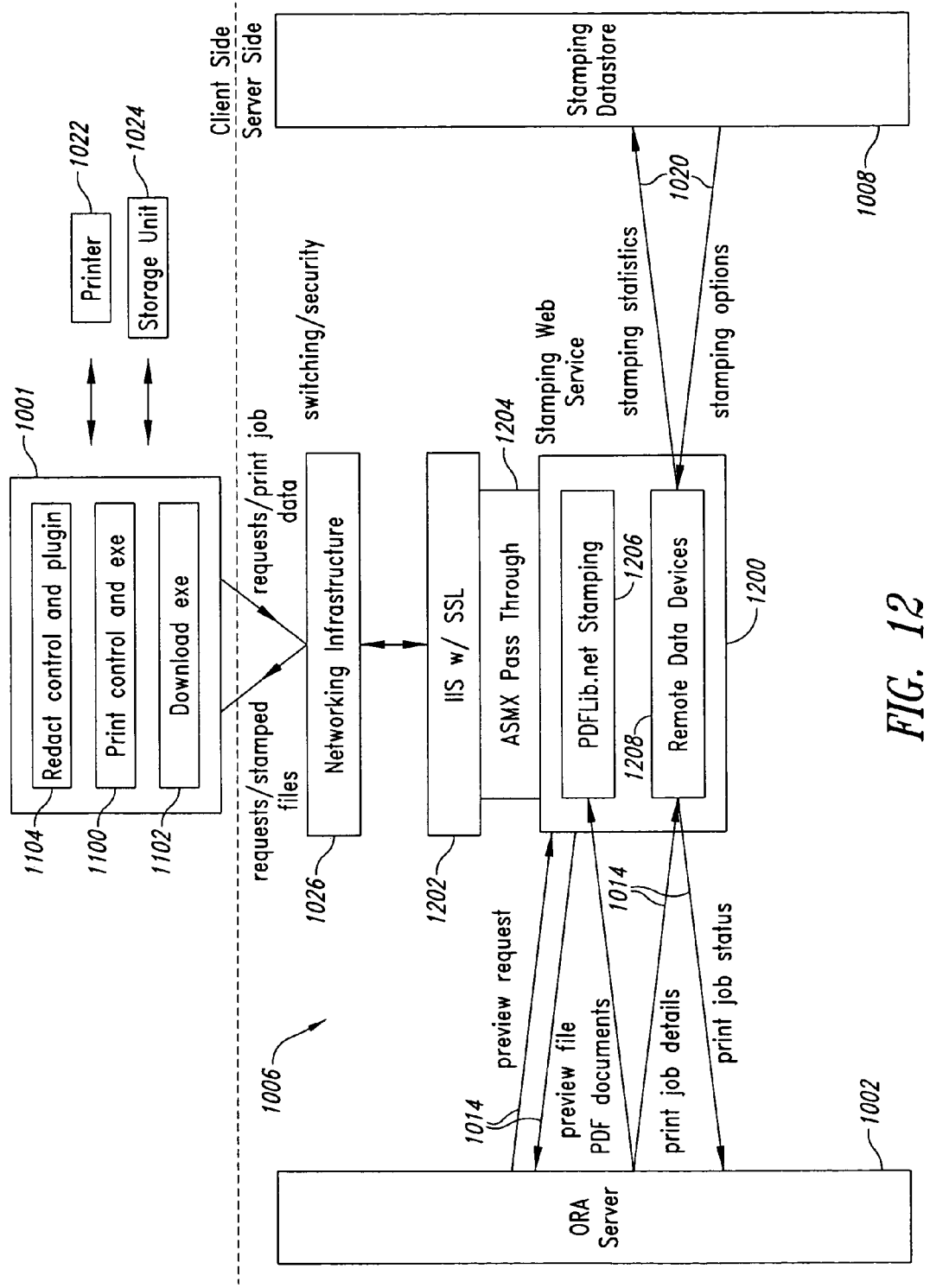
FIG. 12 is a block diagram showing another part of the system of FIG. 10 in more detail in accordance with an embodiment of the invention.

FIG. 12 is a block diagram showing another part of the system 1000 of FIG. 10 in more detail in accordance with an embodiment of the invention. More particularly, FIG. 12 shows an embodiment of the stamping service (or server), such as the stamping application 1120 of FIG. 11, residing at the application server 1006 in more detail. As shown for an embodiment, the client terminal 1001 (or more specifically, the printer executable component 1100 and/or the download executable component 1102) communicates with a stamping service 1200 at the application server 1006 to begin a print job, provide print job data, and to receive stamped files and other responses. In an embodiment, a plurality of stamping services 1200 may be provided for load balancing purposes. For example, an individual print job can be broken up into a plurality of batches, where different stamping services 1200 may process different batches (including batches from different print jobs), as opposed to a single stamping service 1200 processing all batches of a particular print job. The stamping service 1200 of an embodiment comprises an asynchronous computer software program.

As before in FIG. 11 with the ORA server 1002, the application server 1006 communicates with the client terminal 1001 via the communication network 1026 (such as the Internet), and includes an IIS web server with SSL security 1202. The stamping service 1200 of an embodiment includes a stamping component 1206 (such as a PDFLib.net component) that receives copies of the PDF files from the ORA server 1002 (or from some other source, such as the server unit 1134 comprising part of the CFD data and files store 1004), and stamps the PDF documents based on print job details originally sent from the client terminal 1001 and retrieved from the ORA server 1002. The stamping component 1206 also operates to receive and respond to preview requests (such as to provide a preview file to the ORA server 1002 that shows the placement of stamps on an electronic document that is to be printed, as depicted in FIG. 5).

The stamping service of an embodiment further includes one or more remote data services 1208. The data services 1208 operate to receive print job details from the ORA server 1002, and to provide the print job details to the stamping component 1206 to allow the stamping component 1206 to apply the proper stamps to the copies of the PDF files. The data services 1208 also operate to provide print job status information to the ORA server 1002 and stamping statistics to the stamping data store 1008. Stamping options are sent from the stamping data store 1008 to the data services 1208.

Figure 13:
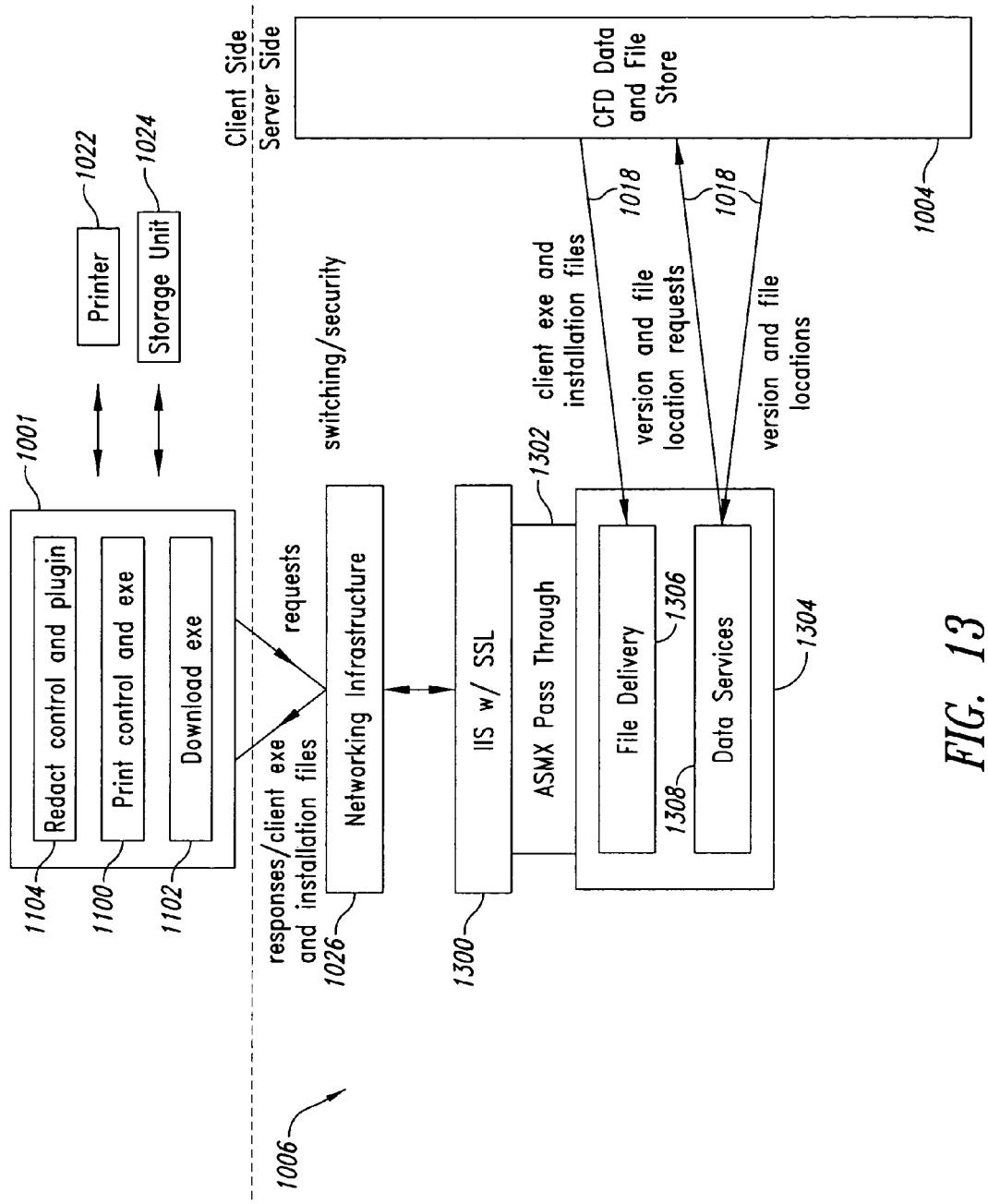
FIG. 13 is a block diagram showing yet another part of the system of FIG. 10 in more detail in accordance with an embodiment of the invention.

FIG. 13 is a block diagram showing yet another part of the system 1000 of FIG. 10 in more detail in accordance with an embodiment of the invention. More particularly, FIG. 13 shows a client file download (CFD) service 1304 residing at the application server 1006 in more detail. The CFD service 1304 of one embodiment operates to respond to requests from the client terminal 1001 for client executable and installation files, such as in connection with the download and installation of the printer executable component 1100 and the download executable component 1102.

Such requests are sent via the communication network 1026, and sent through an IIS web service with SSL security 1300. An ASMX pass through component 1302 may also be present to interface with the CFD service 1304.

The CFD service 1304 includes a file delivery component 1306 in one embodiment. The file delivery component 1306 operates to obtain the client executable and installation files from the CFD data and file store 1004 or from some other source, and to provide such files to the client terminal 1001 for installation. An embodiment of the CFD service 1034 further includes one or more data services 1308. The data services 1308 operate to request and receive version and file locations from the CFD data and file store 1004. After receipt and processing (if necessary), such version and file location information may be provided to the file delivery component 1306 (or other component) to obtain the corresponding files.

Figure 14:
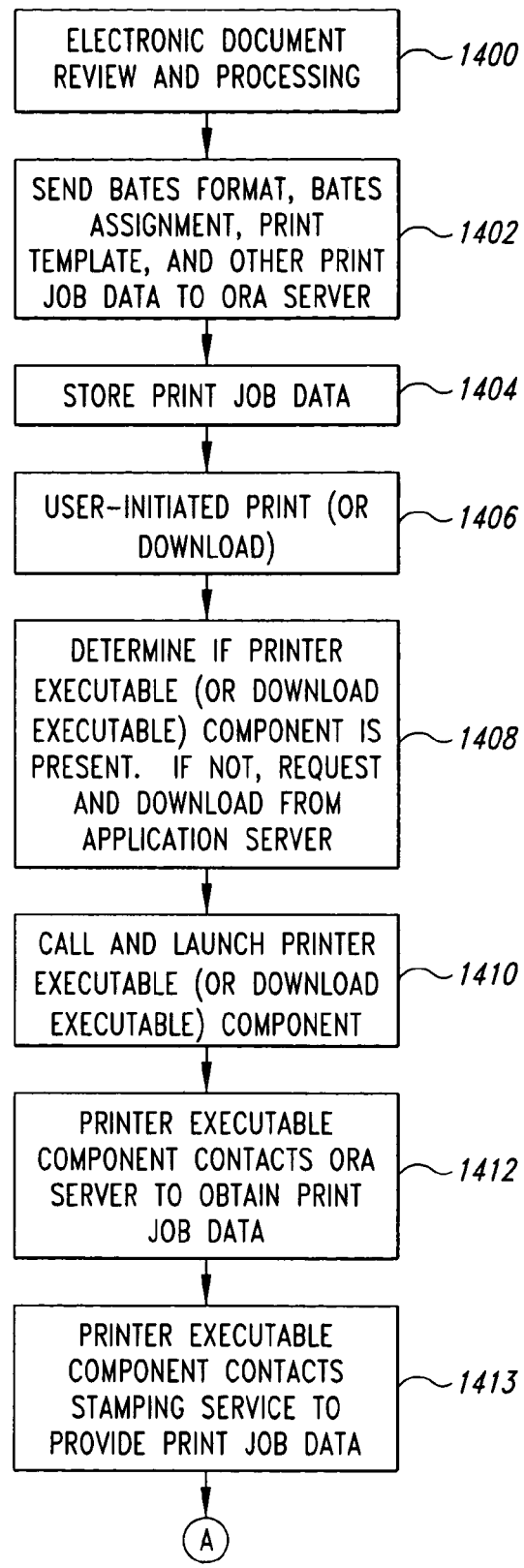
FIGS. 14-16 are flowcharts illustrating stamping, batch printing, and other operations that can be performed with the system of FIGS. 10-13 in accordance with one or more embodiments of the invention.
Figure 15:
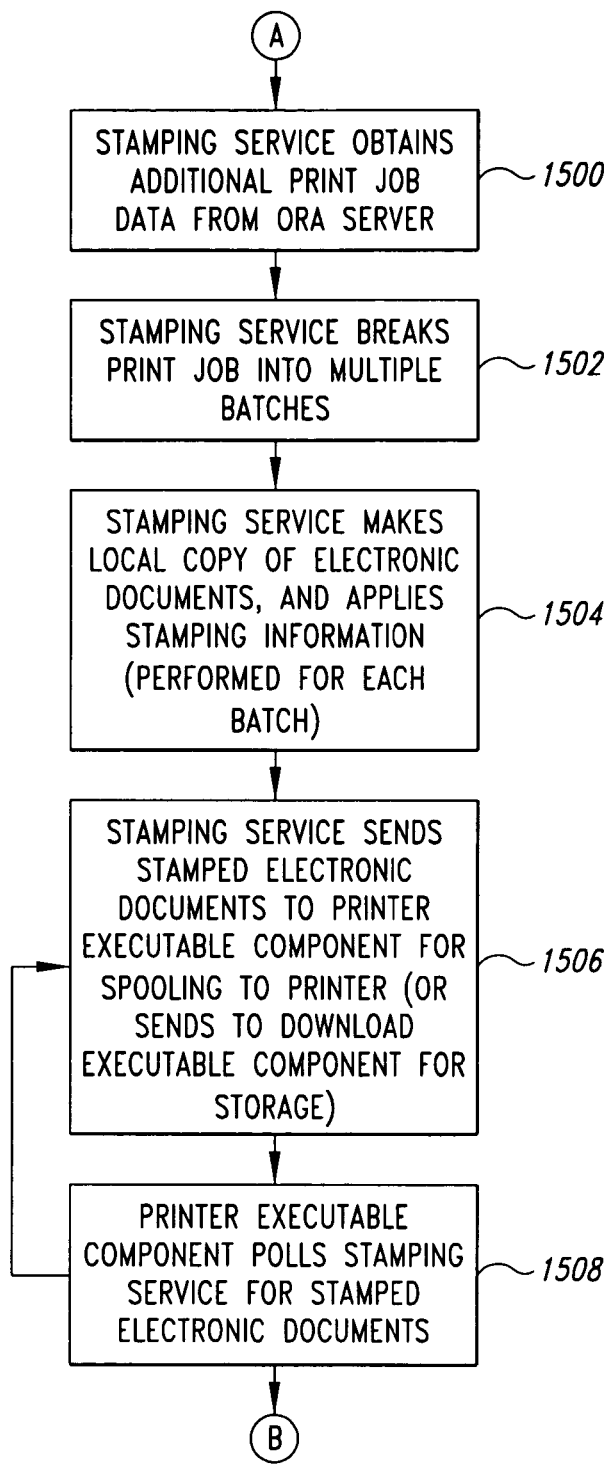
Figure 16:
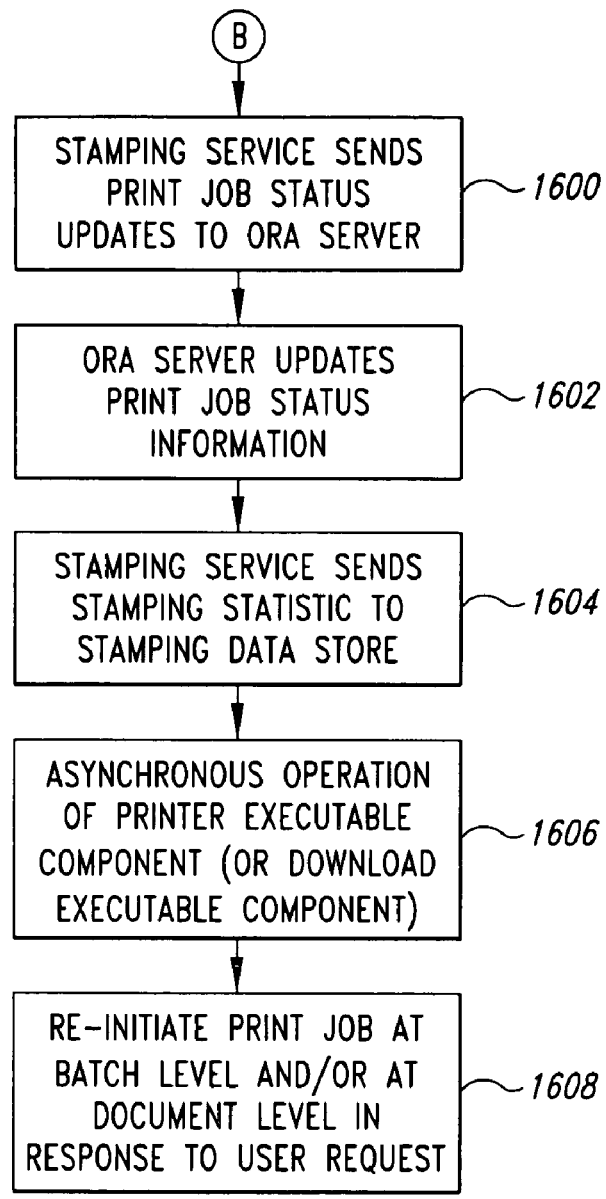

FIGS. 14-16 are continuous flowcharts illustrating stamping, batch printing, and other operations that can be performed with the system 1000 and parts thereof from FIGS. 10-13 in accordance with one or more embodiments of the invention. Elements of these flowcharts can be embodied as software or other machine-readable instruction stored on a machine-readable medium. The software on the machine-readable medium can be present at the client terminal 1001 or at any of the server side components (such as at the ORA server 1002, application server 1006, or other server side locations). The various operations shown in the flowcharts need not necessarily occur in the exact order shown. Moreover, it is appreciated that some operations can be modified, removed, added, or combined in a manner different from the embodiments specifically shown and described herein.

At a block 1400 in FIG. 14, electronic document review by the user and related processing is performed. For instance and as described more fully in the co-pending applications identified above, the user can submit queries for certain electronic documents, annotate the documents (e.g., mark electronic documents as "privilege," "responsive," etc., wherein such annotations become part of the metadata associated with these electronic documents), apply Bates numbers having certain Bates formats thereto, place electronic documents into collections, and so forth. At a block 1402, if the user wishes to subsequently print or download electronic documents, the user can specify Bates format, specify Bates assignment, create print templates (information from which will be used to "stamp" the electronic documents), and provide other data usable for stamping in connection with a print job as depicted in FIGS. 1-5. Such print job data is sent by the client terminal 1001, or more specifically a browser component running at the client terminal 1001 in an embodiment, to the ORA server 1002.

The ORA server 1002 stores the print job data at a block 1404. In an embodiment, ASP pages are created by the ORA server 1002 to generate the data structures for the print job, such as ASP pages for Bates formatting and assignments. Alternatively or in addition, the print job data may be stored in a metadata database (such as at the server unit 1132 of FIG. 11), separate from but accessible to the ORA server 1002.

User-initiated print commands (or download commands) occur at a block 1406. These commands to print or download can be provided via the user interfaces of FIGS. 6-8. For instance at the block 1406, the user can specify which electronic documents to print, the client billing number for the print job, which print template to apply, and so forth.

At a block 1408, the browser determines if the printer executable component 1100 (or the download executable component 1102) is present at the client terminal 1001. If not present, then the browser requests and downloads for installation the printer executable component 1100 (or the download executable component 1102) from the application server 1006. The installed printer executable component 1100 (or the download executable component 1102) is then called by the browser and launched at a block 1410.

At a block 1412, the printer executable component 1100 and/or some other controller 1106 (such as an Active X control) contacts the ORA server 1002 to obtain at least some of the print job data that was previously sent to the ORA server 1002, to select pages to print, or to perform other related operations. In this manner, the printer executable component 1100 is able to determine which template (such as a template ID), electronic documents, and other information corresponds to the current print request or print job. At a block 1414, the printer executable component 1100 contacts the stamping service 1200 to provide the print job data. More specifically in an embodiment, the printer executable component 1100 can provide information to the stamping service 1200 such as print job ID, print template ID, electronic document ID range, Bates format and assignments, or other print job information.

Continuing on to a block 1500 in FIG. 15, the stamping service 1200 obtains additional print job data ("print job details") from the ORA server 1002. The print job details can include the specific stamps (e.g., type and format) from a template that are to be applied to the electronic documents in the document ID range for the particular print job ID, and other print job data that is usable for the stamping process and which may not have been otherwise provided by the printer executable component 1100 at the block 1414.

At a block 1502, the stamping service 1200 breaks up the print job into multiple batches. For example, one embodiment of the invention breaks up a print job into batches of 20 pages. It is appreciated that other embodiments can break up a print job into batches having greater or fewer pages, and that it is also possible to provide single print jobs that individually have variable sizes of batches. The size of the batches can be user-configurable or can be configured at the server side by the printing service provider.

For each batch of electronic documents, the stamping service 1200 makes a local copy of the electronic documents (obtained from the read-only copies stored at the server unit 1134) at a block 1504. In an embodiment, such copies are PDF-format copies in the form of temporary files. The stamping information from the templates is applied to each batch at the block 1504.

At a block 1506, the stamping service 1200 sends the stamped electronic documents to the printer executable component 1100 for spooling to the printer 1022. Alternatively or in addition, the stamping service 1200 sends the stamped electronic documents to the download executable component 1102 for storage in the storage unit 1024.

In one embodiment, the printer executable component 1100 polls (every 3 seconds, for instance) the stamping service 1200 for stamped electronic documents at a block 1508. That is, regardless of whether the stamping service 1200 has finished stamping and sending an entire batch back to the printer executable component 1100, the printer executable component 1100 queries the stamping service 1200 for stamped documents that it has completed thus far. In response, the stamping service 1200 returns whatever electronic documents have been stamped to the printer executable component 1100 at the block 1506, even if the stamping service 1200 has not completed stamping the entire batch (i.e., a "partial batch" is returned). Thus, it is possible for the stamping service 1200 to return fewer than 20 pages to the printer executable component 1100 in response to a poll. If there are multiple stamping servers 1200 being used, the printer executable component 1100 can poll each of them in succession to thereby continuously receive a flow of stamped electronic documents (e.g., multiple partial batches).

Figure 9:
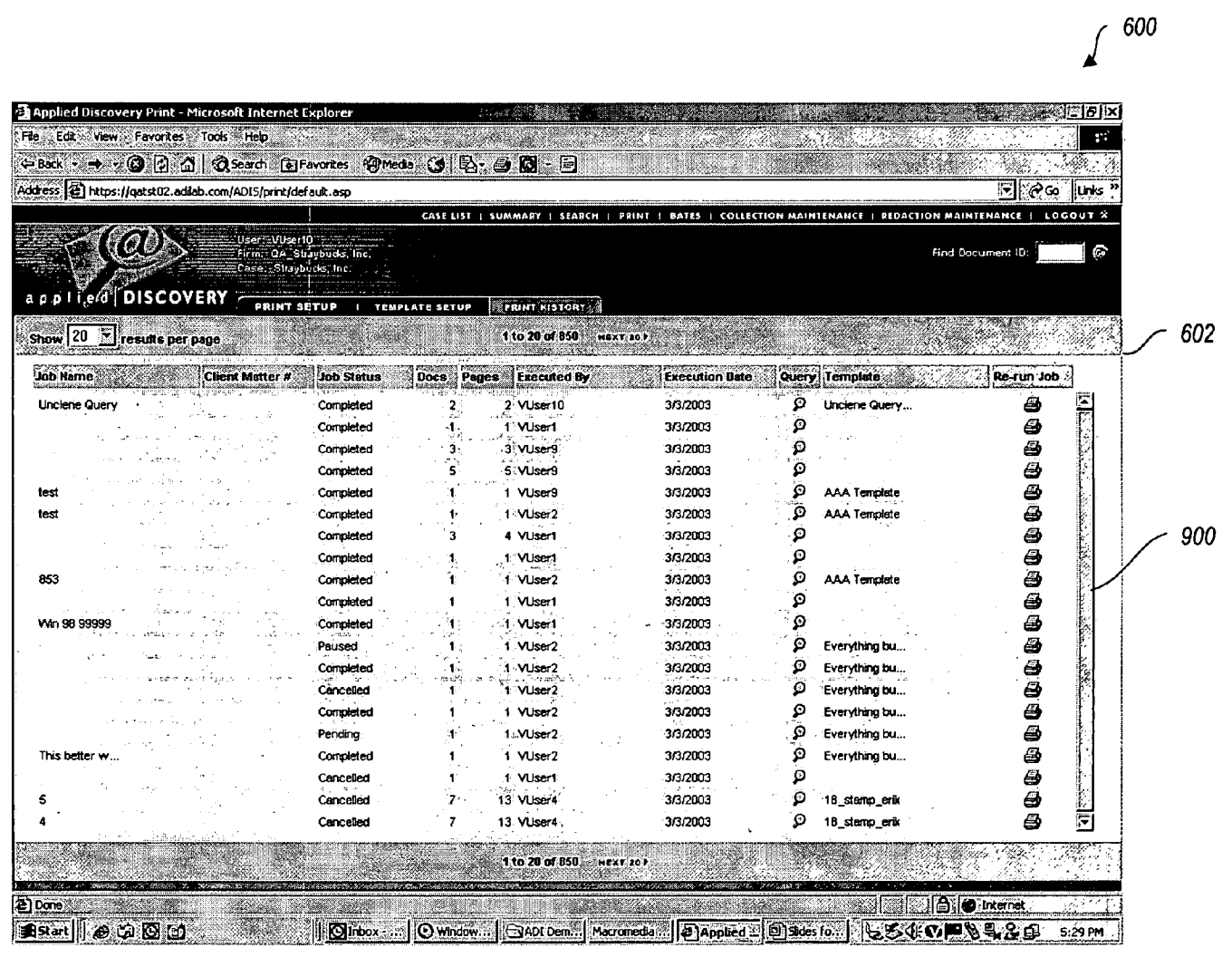

Continuing on to a block 1600 in FIG. 16, as the stamping service 1200 performs and finishes stamping and sending each batch to the printer executable component 1100, the stamping service 1200 sends print job status updates to the ORA server 1002. In this embodiment, the ORA server 1002 keeps track of and updates the batches at a block 1602 (e.g., completed, pending, canceled, paused, error, etc.) as the electronic documents are stamped and sent to the printer executable component 1100, so that in the event that there is an error (e.g., the printer 1022 runs out of paper, network disruption, or other malfunction), the printer executable component 1100 can access and use this information at the ORA server 1002 to determine which batches have been successfully printed and can re-start the printing process starting at the batches that did not successfully print, as opposed to re-starting the entire print job at the beginning. FIG. 9 above shows a user interface that displays print job status information that may be obtained by the client terminal 1001 from the ORA server 1002. User requests to re-initiate a print job at a batch level and/or at a document level are illustrated at a block 1608.

Additionally in an embodiment, the stamping service 1200 sends stamping statistics or other stamping-related information to the stamping data store 1008 at a block 1604. The stamping statistics can include, for instance, identification of the amount of electronic documents have been stamped, as well as identifying which electronic documents have been stamped.

A block 1606 generally illustrates that the printer executable component 1100 (or the download executable component 1102) operates asynchronously. Thus, these components can run independently of other applications and not tie up resources. Moreover, breaking up a print job into multiple batches allows time for activities between the batches, such as stamping other batches while a batch is being spooled to the printer 1022, allowing the user to use email or "surf" the Internet while batches are being stamped and printed, allowing the user to use other applications (such as a word processor) while batches are being stamped and printed, and so on. Additionally, the operations by the stamping service 1200 at the blocks 1504 and 1506 may be distributed among multiple stamping services 1200 for load balancing purposes, with batches from the same or different print jobs.

While the above flowcharts have been generally described in the context of printing, it is appreciated that analogous operations can be performed when downloading electronic documents for storage or other purposes. In such situations, the download executable component 1102 operates analogously to the printer executable component 1100 as described above, with the stamping, polling, storage, and other download operations being performed on a batch level as with the printing process.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For example, while various screen shots have been illustrated and described herein, it is appreciated that such screen shots and the underlying operations and content that they represent are merely examples. Other layouts, menus, windows, formats, selections, organizations, content, operational features, and the like, as well as modifications and combinations thereof, may be provided in other embodiments.

Furthermore, embodiments are described specifically with respect to PDF formats or ASP pages. It is understood that these are merely examples that are provided in order to better explain features of embodiments of the invention. Other embodiments may be provided that are not necessarily based on PDF formats or on use of ASP pages.

Moreover, while examples have been described herein in the context of discovery in a legal proceeding, it is appreciated that embodiments may have application towards other types of legal processes, such as mergers and acquisitions, legal research, and other legal processes that can potentially involve processing of electronic files. It is further appreciated that some embodiments may also have application towards implementations that do not necessarily involve a legal process at all, such as situations where a party may wish to obtain (such as download for storage or printing) a high volume of electronic documents via a network.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method in a computing system, comprising:
under control of the computing system,
receiving a print job that requests to print a set of electronic document pages that are available from a communication network;
breaking up the print job into a plurality of batches each having a plurality of electronic document pages that together form the set of electronic document pages;

before printing each batch of said print job, applying stamps to the electronic document pages of each said batch, such that stamps are applied to at least one batch while at least one already stamped batch of said print job is currently printing; and under control of a server of the computing system, controlling the printing of said batches of said print job by separately sending said each batch having said respective stamps that have been applied to electronic document pages of said batch to a client terminal to be printed, while electronic document pages of other batches of said print job that are awaiting to be printed are having said respective stamps applied, wherein all said batches of said print job are sent to said client terminal for printing on a same single printer of said client terminal.

2. The method of claim 1, further comprising logging print job status information as electronic document pages of each batch are stamped and sent to the client terminal.

3. The method of claim 2, further comprising if an interruption occurs during printout of electronic document pages of a batch:

checking the logged print job status information to determine which batch was last successfully printed; and re-starting the print job at a batch subsequent to the batch that was last successfully printed, instead of re-starting the print job from its beginning first batch.

4. The method of claim 1, further comprising:

receiving a poll from the client terminal that requests transmission of electronic document pages that have been stamped;

sending the requested stamped electronic document pages to the client terminal, the requested stamped electronic document pages sent to the client terminal forming less than a complete batch.

5. The method of claim 1, further comprising:

receiving a download request for another set of electronic document pages;

breaking up the download request into a plurality of batches each having a plurality of electronic document pages that together form the another set of electronic document pages;

applying stamps to these electronic document pages of each batch; and separately sending each of these batches having stamps applied to its electronic document pages to the client terminal, while electronic document pages of other batches are having stamps applied to them.

6. The method of claim 5 wherein receiving the download request comprises receiving a request to store the requested set of electronic document pages in a storage unit.

7. The method of claim 1, further comprising:

determining whether a printer executable component to manage flow of the received stamped electronic document pages to a print spooler is present at the client terminal;

if the printer executable component is determined to not be present, downloading and installing the printer executable component in the client terminal; and launching the printer executable component if a print job is generated.

8. The method of claim 1, further comprising:

storing print job data, including template information usable for applying the stamps to the electronic document pages, at a first server remote from the client terminal;

if the print job is generated, providing at least some of the print job data to the client terminal;

at a second server, receiving the print job data from the client terminal and obtaining template information corresponding to the print job data from the first server.

9. The method of claim 1, further comprising making a temporary copy of the each electronic document page, wherein applying stamps to electronic document pages of each batch includes applying stamps to the temporary copies.

10. The method of claim 1, further comprising generating stamping statistics indicative of either one or both of which electronic document pages have been stamped and an amount of electronic document pages that have been stamped.

11. The method of claim 1, further comprising printing the stamped electronic document pages asynchronously from other applications running on the client terminal.

12. A system, comprising:

a printer executable component to control download of remote electronic files to a printer;

a server communicatively coupled to the printer executable component to store print job data; and at least one stamping service in communication with both the server and the printer executable component, wherein when the printer executable component is launched to initiate a print job, the printer executable component is coupled to obtain at least some of the stored print job data from the server and to provide this obtained print job data to the stamping service, the printer executable component being configured to use the print job data to obtain stamps from the server that are to be applied to a set of electronic files before being printed by said printer and to break up the print job into multiple batches having a plurality of pages that together form the set of electronic files, the printer executable component being further configured to apply the obtained stamps to pages of each batch of said print job before being printed by said printer and to download the pages having stamps applied thereon to either one or both the printer executable component and the printer while pages of other batches of said print job that are awaiting to be printed are being stamped, wherein all of said multiple batches of said print job are sent to same said printer to be printed therefrom.

13. The system of claim 12, further comprising a plurality of stamping services, each stamping service being configured to stamp pages of batches corresponding to a same print job.

14. The system of claim 12 wherein the printer executable component is configured to poll the stamping service to request pages that have been stamped, the stamping service being further configured to send the requested pages, which may comprise less than all pages in a batch.

15. The system of claim 12 wherein the stamping service is configured to provide print job updates to the server, wherein the printer executable component is adapted to access the print job updates at the server to re-start the print job in case of interruption, at a batch subsequent to a batch that was last successfully printed, instead of a re-start of the print job from a first batch.

16. The system of claim 12 wherein the printer executable component operates asynchronously of client applications.

17. The system of claim 12, further comprising:

a first server unit to store indexed content of the electronic files;

a second server unit to store metadata content of the electronic files, the metadata content including stamps that are obtained by the stamping service and applied to pages of the electronic files; and a third server unit to store the pages of the electronic files, the stamping service being configured to obtain a temporary copy of the stored pages and to apply the stamps thereto.

18. The system of claim 12, further comprising a stamping data store in communication with the stamping service to store stamping statistics that are provided by the stamping service.

19. The system of claim 12 wherein the server is adapted to request print preview information from the stamping service, the stamping service being configured to provide the preview information as a representation of a page having stamps applied thereto, the server being able to subsequently provide the preview information to the printer executable component.

20. The system of claim 12, further comprising at least another executable component, including a download executable component to control storage of stamped pages of batches to a storage unit.

21. The system of claim 12, further comprising a plurality of user interfaces usable to perform at least one of create a template having the stamps, assign Bates number formats to the electronic files, identify a print job, view print job status information, select a location to save the stamped pages, and/or select a printer to print the stamped pages.

22. The system of claim 12, further comprising another server to download the printer executable component to a client terminal if the printer executable component is not installed in the client terminal if the print job is initiated.

23. The system of claim 22 wherein the printer executable component is downloaded to be installed as part of a browser application on the client terminal.

24. A computer system comprising:
   a means for receiving a print job that requests to print a set of electronic document pages that are available from a communication network;
   a means for breaking up the print job into a plurality of batches each having a plurality of electronic document pages that together form the set of electronic document pages;
   a means for applying, before printing each batch of said print job, stamps to the electronic document pages of each said batch, such that stamps are applied to at least one batch while at least one already stamped batch of said print job is currently printing; and
   a means for controlling the printing of said batches of said print job by separately sending said each batch having said respective stamps that have been applied to electronic document pages of said batch to a client terminal to be printed, while electronic document pages of other batches of said print job that are awaiting to be printed are having said respective stamps applied, wherein all said batches of said print job are sent to said client terminal for printing on a same single printer of said client terminal.

25. The system of claim 24, further comprising:
   a means for storing the electronic document pages and associated metadata, including template information having the stamps that are applied to the electronic document pages;
   a means for querying for and returning corresponding data results associated with stored electronic document pages that are stamped;
   a means for providing preview information of electronic document pages showing stamps applied thereto; and
   a means for downloading executable files to the client terminal if the executable files are not yet installed in the client terminal when the print job is initiated.

26. The system of claim 24, further comprising a means for updating print job status information and for keeping stamping statistics.

27. The system of claim 24, further comprising means for downloading batches having stamped electronic document pages for purposes different from printing.

28. The system of claim 24, further comprising a means for polling to identify and obtain electronic document pages of a batch that have been stamped and that are ready to be printed, wherein such electronic document pages comprise less than a full batch.

29. The system of claim 24, further comprising user interface means for creating templates and for initiating print jobs.

* * * * *